May 11, 1965  W. E. MYLES  3,183,295
LIGHT PIPE
Filed June 11, 1962  4 Sheets-Sheet 1
FIG. IB
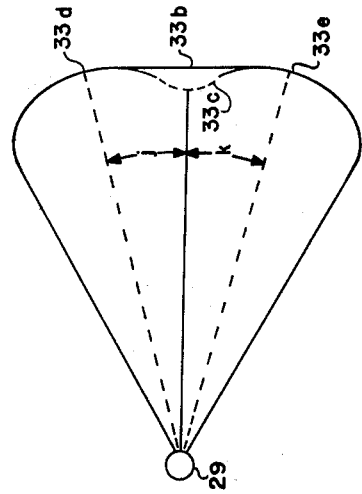
FIG. 2B
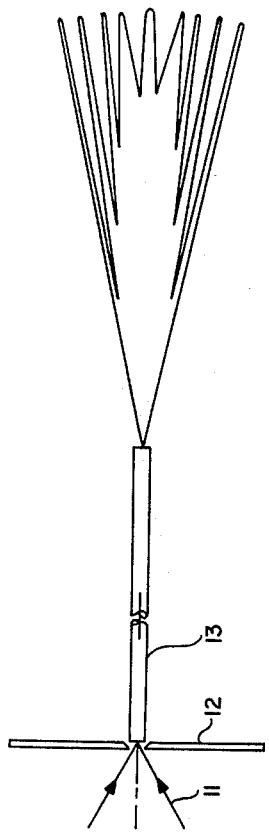
FIG. IA
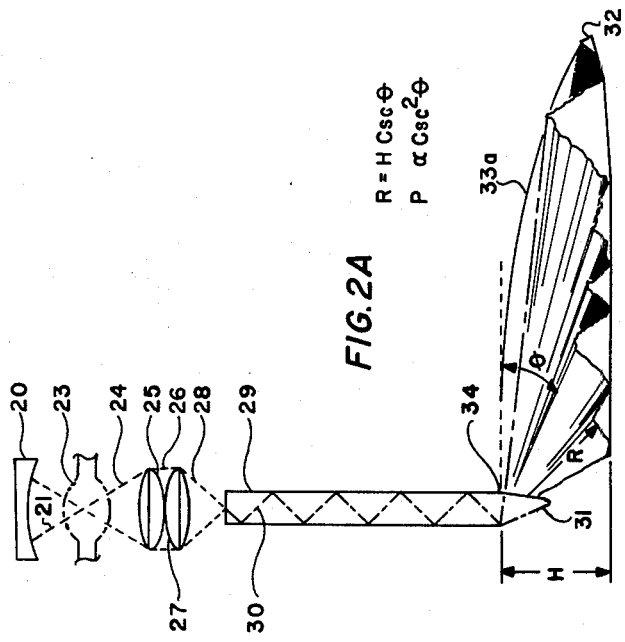
FIG. 2A
$R = H \csc \phi$
$P \propto \csc^2 \phi$
BY *[signature]*

May 11, 1965   W. E. MYLES   3,183,295
LIGHT PIPE

Filed June 11, 1962   4 Sheets-Sheet 2

BY *Heston R. Pfleger Jr.*

May 11, 1965 W. E. MYLES 3,183,295
LIGHT PIPE
Filed June 11, 1962 4 Sheets-Sheet 4

BY Walter R. Pflager Jr.

United States Patent Office 3,183,295
Patented May 11, 1965

3,183,295
LIGHT PIPE
Walter E. Myles, Alexandria, Va., assignor to ACF Industries, Incorporated, New York, N.Y., a corporation of New Jersey
Filed June 11, 1962, Ser. No. 201,691
5 Claims. (Cl. 35—10.4)

This invention relates to light beam shaping and more particularly to light pipes for transmitting light from a high intensity source into a shaped beam of a desired configuration.

In pending application, Serial No. 804,755, now Patent No. 3,090,135, granted May 21, 1963 to Robert M. Eisenberg for Land Mass Simulator and assigned to the same assignee as the present application, there is described a light reflective land mass radar simulating system in which the output of a light optical system is caused to illuminate a three dimensional map surface area in a manner analagous to a search radar beam, so that the reflected video signals received at the light pick up which is analagous to a radar receiver, modulate the intensity of the indicator sweeps to produce a radar display representative of the map surface. The output end of the light source is raised or lowered to simulate changes in altitude of the aircraft and search antenna and corresponding changes in the map area illuminated. The light source and collimating lens assembly are too large to be mounted at the light output end of the system where space is limited especially when simulating flying in the valleys of the relief map. Accordingly a light pipe was used to transmit the light to the point where it was dispersed to the map. The output end of the light pipe was formed into a configuration that would disperse the light to illuminate a desired area of the map.

It was stated in Patent No. 3,090,135 that the technique employed was adaptable to a low power light source and in that embodiment the lamp was described as a relative low power incandescent bulb and the light pipe was stated to be constructed of a Lucite plastic rod 1/8 inch in diameter.

In other applications of land mass radar simulating systems it has been found desirable to illuminate the map area with more light to produce stronger signals at the receiver for displaying more map detail. The incandescent bulb of the above mentioned patent will not supply the required number of lumens nor will the Lucite light pipe handle this number of lumens in the permissible size without melting. Also at low altitudes, the uniformly distributed light output of a light pipe will produce an objectionable hot spot on the map as a result of the inverse square law of radiation intensity. Furthermore it is desirable to disperse the light from the output end of the light pipe in a cosecant squared type radiation pattern which corresponds to the beam from a normal aircraft search radar antenna.

It is accordingly an object of this invention to provide an improved light pipe for dispersing light into a desired pattern.

It is another object of this invention to provide an optical system which will transmit a large amount of lumens from a high power light source at the input to a desired radiation pattern at a small physical sized output.

It is a further object to provide a light pipe which will transmit and redistribute light into a cosecant squared type radiation pattern.

It is a feature of this invention that it will handle high intensity focussed beams of light and associated temperatures and redistribute it in a desired pattern without objectionable hot spots from an output end that may be driven into small confined locations.

These and additional objects and features are accomplished in the present invention by focussing the output of a suitable mercury vapor arc lamp to a spot on the central axis at the input end of a high temperature resistant, low adsorption, cylindrical light pipe; grinding suitable facets at the opposite end of the pipe and silvering the under sides to produce reflecting surfaces which reflect the transmitted light through scratched cylindrical side walls of the pipe to spread out and diffuse the rays into a desired pattern.

FIGURES 1A and 1B show the light pattern produced by meridional rays in a short single fiber light pipe.

FIGURE 2A is an optical elevational diagram illustrating the optical system of the present invention.

FIGURE 2B is a plan view of the light pattern of FIGURE 2A.

Figure 3A:
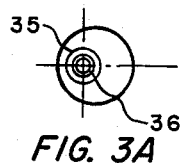
FIGURES 3A and 3B are an end view and a partly sectional view of the light pipe and housing.

In FIGURE 1A, a cone of light 11 is focussed through aperture 12 on the axis of a perfect short fiber cylinder or light rod 13. According to the theory of light pipes, the light will be refracted upon entering the rod 13 because of the difference in refractive indices between air and the rod, and will then proceed as refracted inside the cylinder 13 until it impinges on the cylinder wall. So long as the angle of incidence of incident rays with the normal to the interface between cylinder wall and air is greater than the critical angle for total reflection, the light will not escape out of the sides and will be reflected a number of times along the interface until it finally escapes from the other end at the same angle at which the light entered the cylinder, assuming that the ends are square and the rod straight. Different rays in the cone will follow different reflective paths through the cylinder with the angle which the incidence and reflected rays make with the normal to the point of contact being equal.

A screen 14 spaced from the output end of the light rod will exhibit a number of annular bright and dark rings with the number of bright rings equal to the number of reflections experienced by the extreme rays in the cone.

FIGURE 2A illustrates schematically the complete optical system. The light source 23 represents the arc of a high intensity lamp. In the present embodiment an Osram 100 watt mercury arc lamp has been found to be suitable. It operates very satisfactorily at 20 volts and 5 amperes D.C. to produce an arc .012 inch in diameter and an overall output of 2200 lumens with an intensity of over 300 foot candles. It produces more radiation in the blue and ultra violet than in the visible range of the spectrum. This light is useable by the Vidicon described in the foregoing patent. Biconvex lens 25 is positioned at approximately a focal length in front of the apparent point source of lamp 23 to intercept the largest cone of light in the forward direction from the lamp. Biconvex lens 27 which is identical to lens 25 but reversed back to front is placed in contact with lens 25 to focus the rays of light 26 in a cone of light 28 on the central axis of light rod 29. The dash-dot line 30 shows the path of a typical ray of cone of light 28 as it is reflected from wall to wall within light pipe 29. When the ray gets to the bottom of light pipe 29 it strikes one of the reflecting surfaces 31 and is reflected through the cylinder walls of the light pipe out into the air to illuminate map 32. The front of the light pipe cylinder walls where the light rays leave the light pipe contains scratches 34 to diffuse the light and eliminate the dark rings of FIGURE 1B. Reflecting surface 31 as well as the other reflecting surface 51 not shown in FIGURE 2A is positioned with respect to the axis of light pipe 29 so that all of the rays from light cone 28 which are reflected from the reflecting surfaces through the cylinder walls of the light pipe produce vertical light pattern 33a which has the approximate shape of a cosecant squared $\theta$ power pattern of a search radar antenna.

FIGURE 2B shows the horizontal portion of the vertical light pattern 33a of FIGURE 2A.

Figure 3B:
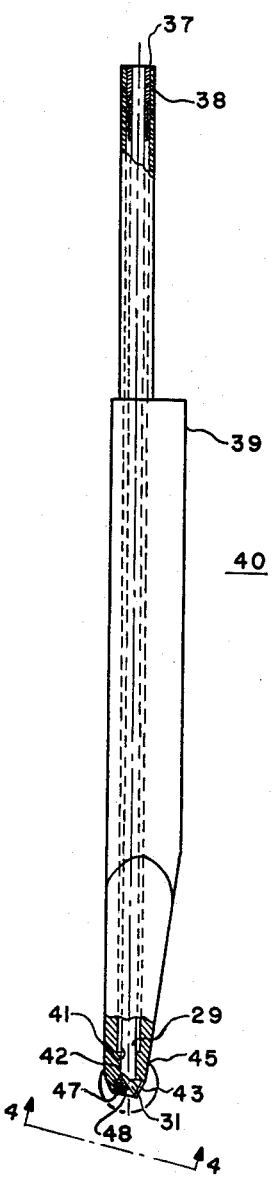

FIGURES 3A and 3B show the light pipe and housing assembly 40. Housing 39 which supports the assembly is made of some strong light reflecting material such as aluminum. It is turned down to a smaller outside diameter 35 at the top which fits into the light source collision switch shown in FIGURE 22 of Patent 3,090,135. Housing 39 is bored from the top to an internal diameter 37 and to a depth 41. Split bushing 38 is pressed into hole 37 at the top of housing 39. Split bushing 38 has a concentric center hole 36 through it for holding the top of light pipe 29. Housing 39 has a similar concentric hole 42 bored into its bottom end for holding the bottom of light pipe 29.

Figure 4:
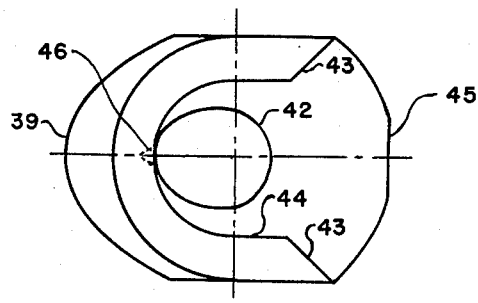
FIGURE 4 is a plan view taken along the cutting plane line 4—4 of FIGURE 3 with the light pipe removed.

FIGURE 4 shows a plan view of the bottom of housing 39 with light pipe 29 removed and taken along cutting plane line 4—4 of FIGURE 3. There is a recess 44 in the bottom of housing 39 opening through two flared edges 43 to the front surface 45 of the housing 39. A small under cut 46 is cut into the back wall of recess 44 to hold cement 47 in place after it hardens.

Figure 5E:
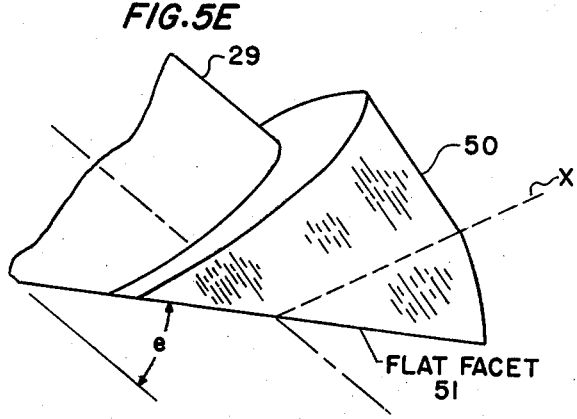
FIGURES 5A, 5B, 5C, 5D, 5E and 5F are outline drawings showing various views of the light pipe of FIGURE 3.
Figure 5B:
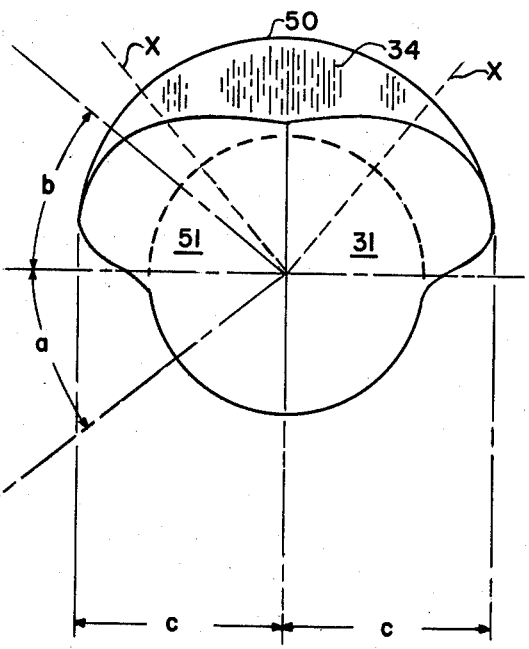
Figure 5F:
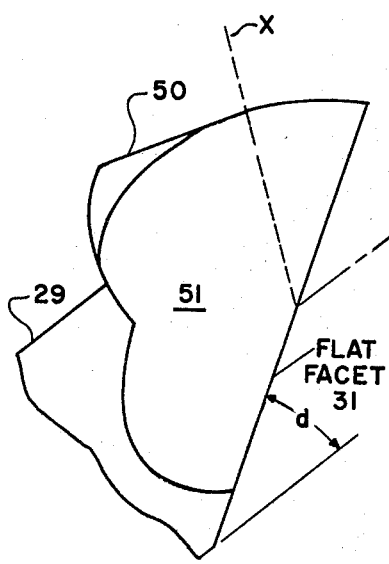
Figure 5C:
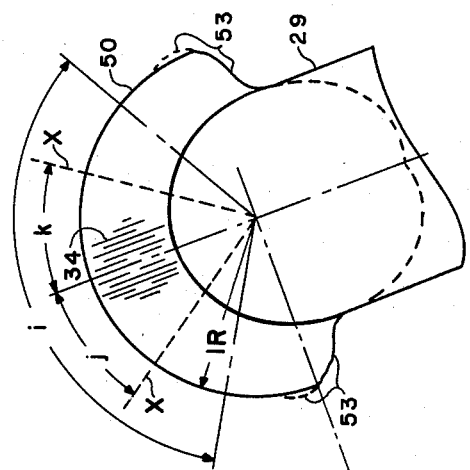
Figure 5A:
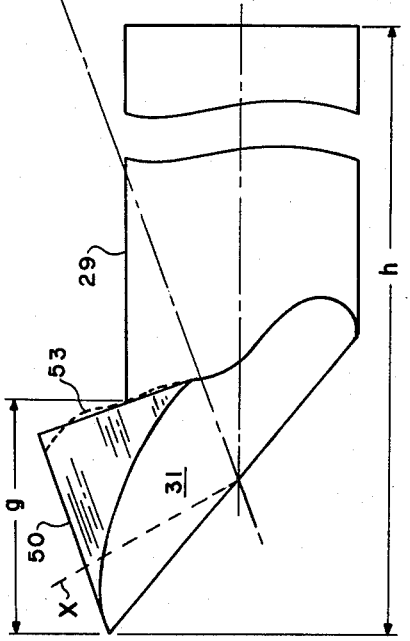
Figure 5D:
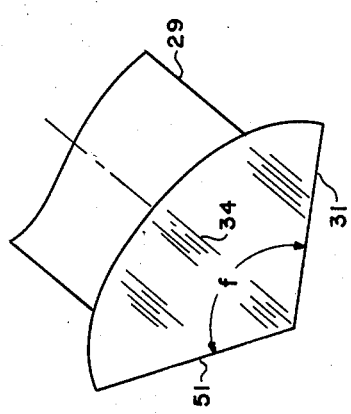

FIGURES 5A, 5B, 5C, 5D, 5E and 5F show constructional details of light pipe 29 in various auxiliary views. The light pipe 29 is made from light transparent, low absorption, high temperature resistant optical material, preferably a synthetic white sapphire flame polished rod for maximum transmission of blue light in the visible range. Quartz or glass is also useable, but the latter has higher absorption characteristics than sapphire. In the present embodiment the shank diameter of light pipe 29 is .040″ and one end is heated to produce the head 50 which is fused to the shank along surfaces 53 as shown in FIGURE 5A to form an eccentric clear ball of $\frac{1}{16}$″ minimum diameter as shown in FIGURE 5C. Two facets 31 and 51 are ground on the underside of the head 50 as shown in FIGURE 5B and then they are polished to a high lustre and aluminized to form an opaque mirror. The aluminized coating may be protected against scratches by applying a coating of silicon monoxide (SiO) over the aluminized surface. FIGURE 5F shows the angle at which facet 31 is cut with respect to the axis of light pipe 29 and FIGURE 5E shows the angle at which facet 51 is cut with respect to the same axis. These facets are shown to be symmetrical to this axis in FIGURE 5D. A coating of water glass $Na_2O \cdot 3SiO_2$ may be applied in spots where required to the cylindrical surface of head 50 to make the light transmission uniform through the surface. The cylindrical head 50 contains vertical scratches 34 over the entire cylindrical surface $i$ parallel to its axis as shown in FIGURES 5A and 5E.

The following table shows the dimensions of one actual embodiment of the light pipe 29 of the present invention for producing an approximate cosecant squared $\theta$ type light pattern. The light pipe 29 constructed with these dimensions results in a light path through the light pipe as shown by the dashed lines X in FIGURES 5A, 5B, 5C, 5E and 5F, when a cone of light is focussed at the axis on the input end of light pipe 29.

Table A

| | |
|---|---|
| a | 38°30′. |
| b | 38°30′. |
| c | .030″ max. |
| d | 32°45′. |
| e | 32°45′. |
| f | 116°30′ reference. |
| g | .040+.010—0. |
| h | 3.477±.002″. |
| i | 120° cylindrical surface. |
| j | 35° reference. |
| k | 35° reference. |
| IR | .030±.002″. |

Figure 6:
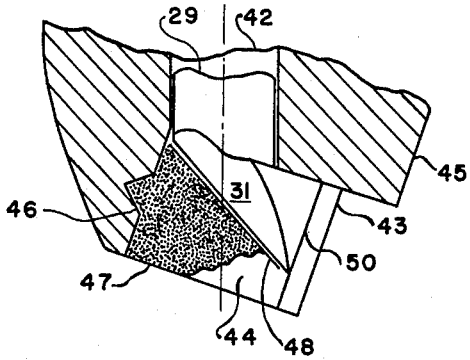
FIGURE 6 is an enlarged sectional view of the bottom of the light pipe and housing assembly of FIGURE 3.

FIGURE 6 shows in an enlarged view the section shown within the circle at the bottom of FIGURE 3 and illustrates the assembly of light pipe 29 within light pipe and housing assembly 40. Light pipe 29 is inserted into the bore of light pipe and housing assembly 40 so that the upper end of the light pipe shank is held by split bushing 38 flush with the tops of the split bushing and housing 39 and the lower end of the light pipe shank is held in concentric hole 42. The scratched cylindrical portion of light pipe head 50 is centrally located between the flared edges 43 of recess 44 shown in FIGURE 4 and faces out toward the front surface 45 of housing 39. A thin strip or coating of water glass 48, may be applied smoothly over the two reflecting surfaces 31 and 51 to cover and protect their undersides and the entire assembly is held in place by filling recess 44 and undercut 46 with a cement material 47, in the present embodiment, an aluminum paste.

As previously mentioned in connection with FIGURES 1A, 1B, and 2A, for a short cylindrical light pipe with its ends parallel and perpendicular to the long axis, a cone of light focussed at the axis on the input end of the light pipe will leave the other end in a series of alternate annular bright and dark rings, the rays leaving the cylinder at the same angle to the axis as they entered. Such a pattern is undesirable for the alternate dark and bright rings will produce false reflected video signals at the receiver. In addition, the space configuration described in the foregoing Land Mass Simulator patent requires that the light pipe be near vertical but tipped out of the line of sight of the Vidicon, and that the light pattern be oriented horizontally in a cosecant squared pattern, so that the pattern of rays that would normally leave the bottom of the light pipe in accordance with FIGURE 1A must be operated on in some manner to be oriented nearly horizontally as shown in FIGURE 2A with the higher intensities in the rays which are close to horizontal and with the intensity falling off rapidly as $\theta$ increases from $\theta=0$ at the horizontal.

Light pipe 29 does not have an exit end parallel to the entrance end. Instead it has two reflecting or mirror surfaces 31 and 51 which are constructed to be at angles $d$ and $c$ with respect to the axis. Remembering that light passing from a denser material to a lighter one is refracted away from the perpendicular drawn to the point of incidence would indicate that the angle subtended by the limiting rays within the light pipe material is less than the angle subtended by the cone of rays when they leave the light pipe as in FIGURE 1A. However, the general pattern is the same within the light pipe material. Hence in light pipe 29, the circular pattern of rays is reflected down to the two mirror surfaces 31 and 51 and the rays are then reflected in accordance with the law of reflection, angle of reflection equal to the angle of incidence, back through the cylindrical head 50 to the outside. However, now the angles which the rays reflected from mirror surfaces 31 and 51 make with the normal of the interface between the outside of head 50 and the outside air at the point of impingement is less than the critical angle, and as a result the rays pass through the head 50 and refract into the air. The position of each ray of light in the air outside of the light pipe with respect to the horizontal is of course determined by the angles *d* and *c* of reflecting surfaces 31 and 51 respectively with respect to the light pipe axis and these angles are set so the envelopes of rays will approximate the desired pattern 33*a* of FIGURE 2A.

In directing the light rays through the walls of head 50, it has been recognized that the rays of light are passing through a plano-convex cylindrical lens before they are refracted into the air. Hence the annular patterns which are reflected from reflecting surfaces 31 and 51 and refract into the air are first compressed to a focussed point and from there expanded in the horizontal direction due to the cylindrical shape of the light pipe head 50, but they remain essentially the same height in the vertical direction, as there is no appreciable vertical curvature in the surface of the head 50 through which the rays pass. This results in a light pattern of alternate bright and dark ellipses having their long dimension horizontal, and if the reflecting surfaces 31 and 51 have been positioned properly, the envelope of the elliptical rays is oriented to approximate the desired vertical cosecant squared pattern 33*a* of FIGURE 2.

To reflecting surfaces 31 and 51 are used to reflect the light coming down light pipe 29 instead of one central reflecting surface because the horizontal beam width of the illumination pattern which is equal to the expanded width of the outside annular ellipse does not cover the required map area to be illuminated for the particular application described. Accordingly two reflecting surfaces 31 and 51 are employed to spread the beam out horizontally as shown in FIGURE 2B. Practically this produces a slight discontinuity with the two peaks 33*d* and 33*e* and some falling away at the center 33*c* from the ideal radar pattern but this is not objectionable and increases the retentivity of the screen as the Vidicon sweeps. The angles *j* and *k* of FIGURE 2B are the same as those shown in FIGURE 5C. It has an advantage in that by dividing the light, brighter areas are dimmed and the overlapping at the center of the composite beam brightens up the darker areas.

In order to eliminate the dark rings entirely, the vertical scratches 34 are cut into the outside surface of head 50 and these scratches scatter the light sidewise in the transverse direction to diffuse into the dark rings and eliminate them. Since the scratches are vertical they do not appreciably scatter the light up and down in the transverse plane and so do not destroy the cosecant squared pattern. The light pipe, constructed as shown and described produces an accurately patterned light beam of great intensity.

It should be understood that a preferred embodiment of the present invention has been described using specific terms and examples but using them in a generic and descriptive sense and not for purposes of limitation, as the scope of the invention is set forth in the following claims.

I claim:
1. In a radar simulator, a system for simulating a cosecant squared $\theta$ type radar antenna beam comprising: a high intensity source of light; a sapphire light pipe having a vertically disposed longitudinal axis and a cylindrical surface at the emitting end of the light pipe; a condensing lens system for focussing light rays from said source along said light pipe axis; two intersecting plane reflecting surfaces oblique to the paths of said rays within the light pipe forming a dihedral angle subtending the cylindrical surface for reflecting said rays vertically through the cylindrical surface into a cosecant squared $\theta$ type pattern and horizontally into a desired beam width; and substantially parallel scratches on said cylindrical surface for diffusing said reflected rays only horizontally.

2. In a radar simulator, apparatus for optically simulating an airborne radar antenna adapted to irradiate a sector of the earth's surface substantially uniformly, said apparatus comprising a light pipe in the form of an elongated cylindrical light conducting rod, means for focussing light on one end of the light pipe, the opposite end of the rod being shaped to substantially uniformly illuminate a sector of a plane surface perpendicular to the rod, said opposite end of the light pipe having a pair of plane reflecting surfaces equally inclined to the axis of the light pipe and intersecting on a line inclined to said axis, said opposite end being further defined by a cylindrical surface portion generated on a larger radius of curvature than the remainder of said rod and extending from one of said inclined surfaces to the other, whereby light traversing the light pipe is reflected by the inclined surfaces through the cylindrical surface.

3. Apparatus according to claim 2, including means on said opposite end for diffusing the light in a plane perpendicular to the axis of the light pipe without appreciably diffusing the light in planes including said axis.

4. Apparatus according to claim 3, wherein said diffusing means includes grooves in said cylindrical surface portion parallel to its axis.

5. Apparatus according to claim 4, wherein the axis of said cylindrical surface portion is oblique to the axis of said rod so that the cylindrical surface is inclined toward said plane reflecting surfaces.

References Cited by the Examiner
UNITED STATES PATENTS

| 2,227,422 | 1/41 | Boerstler | 88—1 |
|---|---|---|---|
| 2,247,258 | 6/41 | Shepard | 88—1 |
| 2,724,766 | 11/55 | Hawley | 240—1 |
| 2,932,294 | 4/60 | Fourestier et al. | 88—1 |
| 2,987,960 | 6/61 | Sheldon | 88—72 |

FOREIGN PATENTS 664,193   1/52   Great Britain.

CHESTER L. JUSTUS, *Primary Examiner.*
MAYNARD R. WILBUR, *Examiner.*